Feb. 20, 1968          P. J. PINTO          3,369,576
LIQUID DISPENSING APPARATUS
Filed Jan. 25, 1965          3 Sheets-Sheet 1
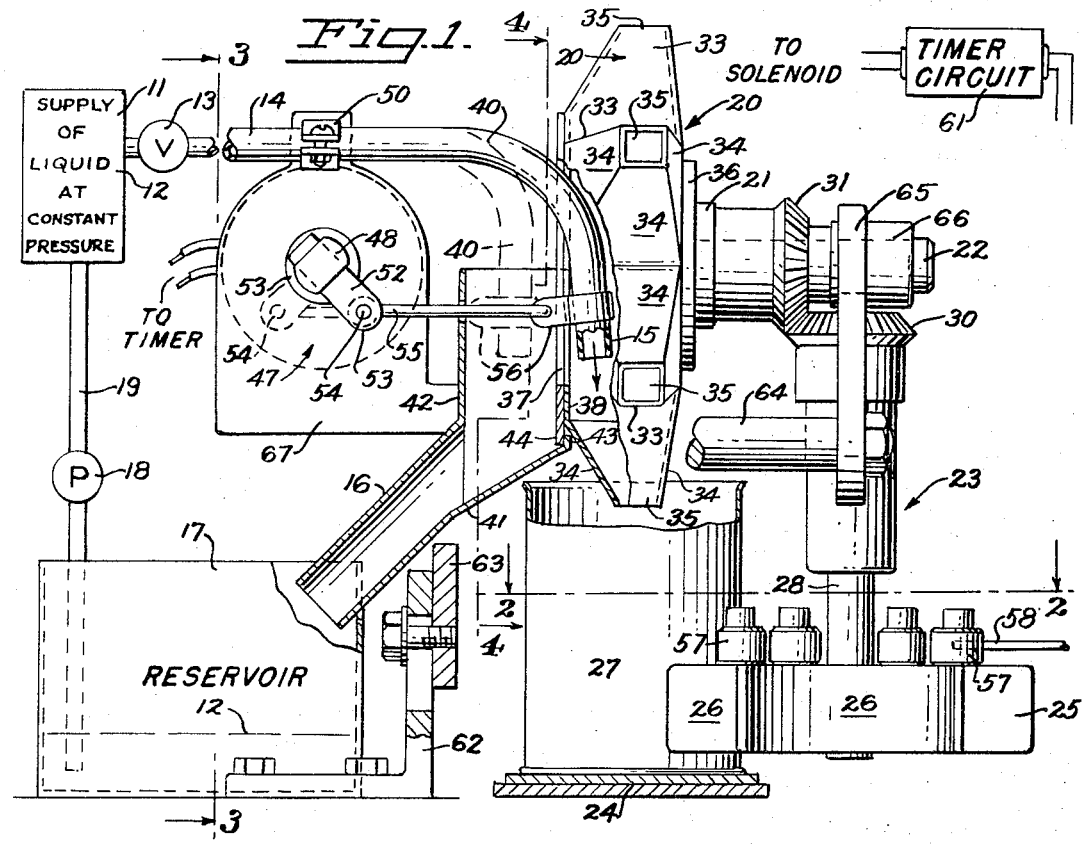
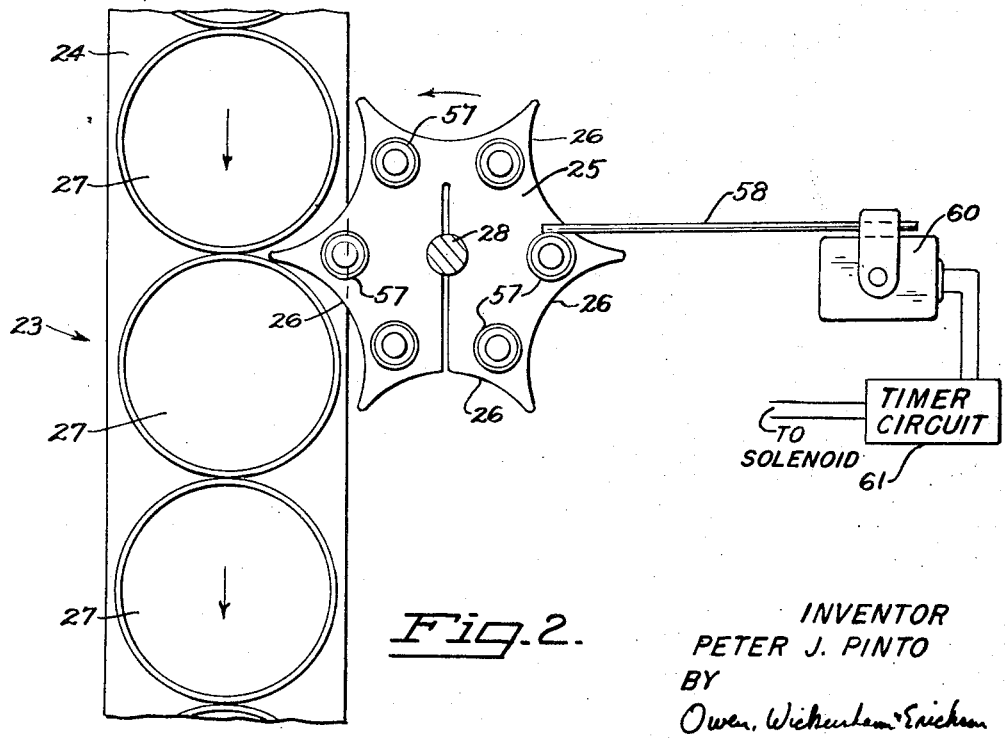
INVENTOR
PETER J. PINTO
BY
Owen, Wickersham & Erickson
ATTORNEYS

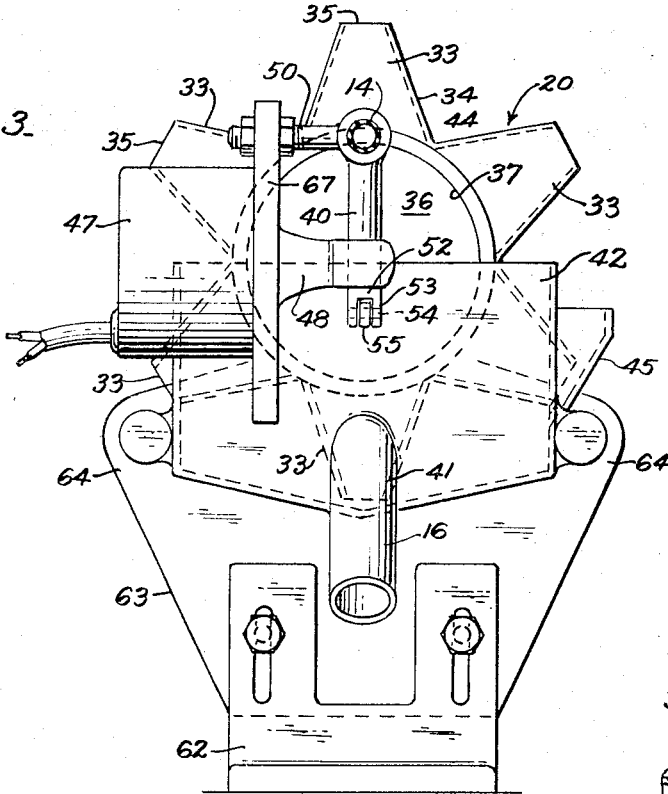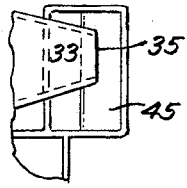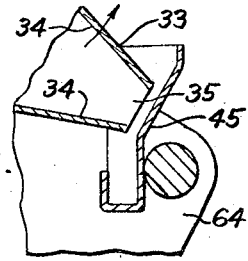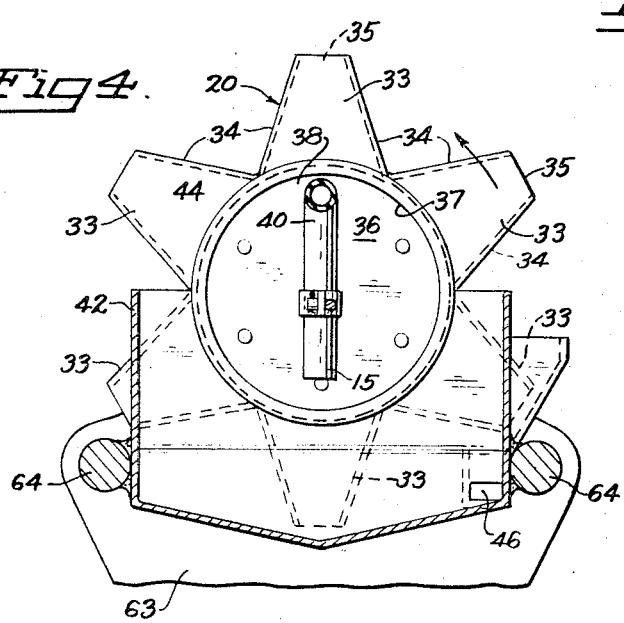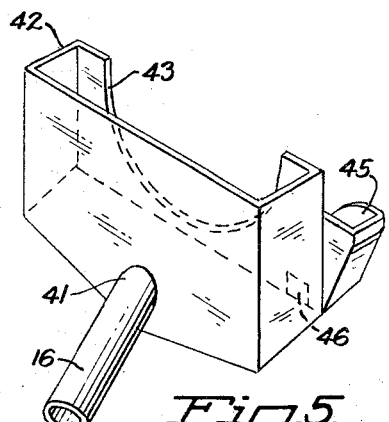

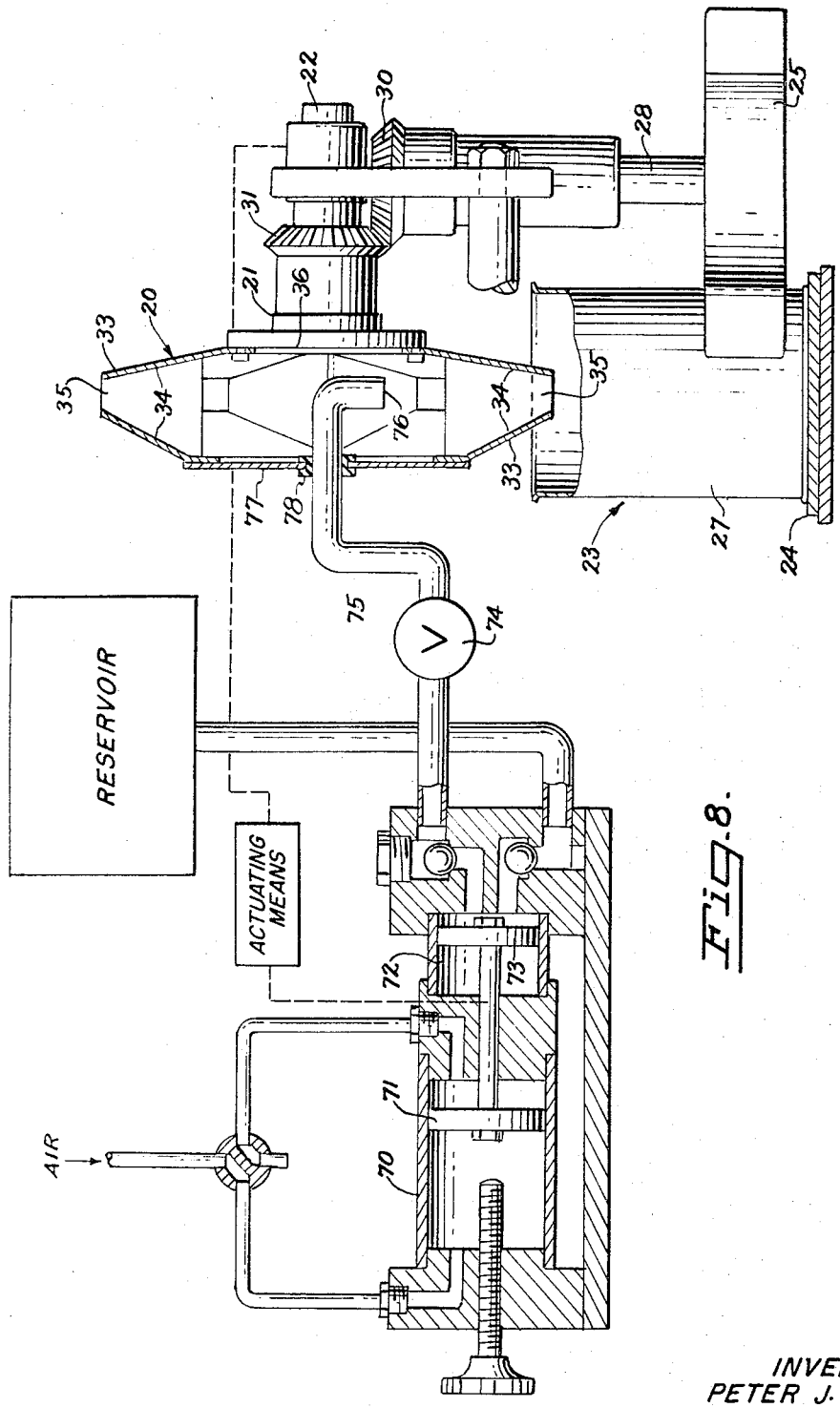

United States Patent Office 3,369,576
Patented Feb. 20, 1968

3,369,576
LIQUID DISPENSING APPARATUS
Peter J. Pinto, Union City, Calif., assignor to Leslie Salt Co., San Francisco, Calif., a corporation of Delaware
Filed Jan. 25, 1965, Ser. No. 427,753
18 Claims. (Cl. 141—86)

ABSTRACT OF THE DISCLOSURE

This liquid dispensing device places a measured charge of liquid into each of a series of rapidly moving containers, while minimizing splatter, drip, and spillage losses. The device is used with a system having liquid supply means and a conveyor for containers. A hollow dispensing wheel is rotatably mounted above the conveyor where the containers pass one at a time. The wheel comprises a circumferential series of successive funnel-like peripheral pouring spouts, always open at both ends and succeeding one another at sharp edges. A measuring means premeasures a charge of liquid and sends it to an outlet, from which it is dispensed in synchronization with the rotation of the wheel into one spout for each container for each charge. The wheel is rotated in synchronization with a container moving beneath it so that one spout moves through a dispensing arc for each container, to fill that one container with its charge while moving in the same direction as the container. The synchronizing may be achieved by the use of a container-actuated star wheel which is connected both to the dispensing wheel and to the measuring means.

This invention relates to a liquid dispensing device of the type used to place a measured charge of liquid in each of a series of rapidly moving containers.

While liquid dispensing devices have long been used in canning lines and in other types of container fillers, problems have developed as the container lines have been made to move more and more rapidly. Splatter, drip, and spillage have occurred due to the movement of the containers. For example, when a series of cans moves very rapidly past a stationary dispensing point, the liquid must be dispensed into the can very quickly, or the can will move on and the full charge will not go into one can. Without very accurate synchronization at such rapid speeds, there is likely to be a bridging of the containers—some of the liquid going into a succeeding container—with the bad results attendant thereto.

Moving so fast in this manner has also caused a considerable problem in that when the necessarily forceful charge issued into the can, it struck the bottom of the can and some of it splashed out, splattering as it did so. Part of the problem has been due to the full force of the liquid being spurted into the can suddenly with great force. A normal way to reduce that force would be to send the liquid through a funnel, but a funnel tended to delay the dispensing of the liquid so that the container tended to move past before the funnel had been fully emptied.

In addition to these problems, there have been problems of obtaining precise synchronization, of getting mechanical expedients which would work with the proper speed and accuracy, and of obtaining the proper recirculation of liquids in certain systems where it is desired to feed the liquid continuously.

The present invention is intended to solve these problems in a way which gives improved performance at high speeds with many types of dispensing equipment, gives adequate return with constant speed devices, and prevents spillage, splatter, drip, and other difficulties encountered with other systems.

Basically, the invention comprises the use of a synchronized dispensing wheel having a plurality of successive pouring spouts around its periphery, each spout having sloping walls that lead to an outlet. The wheel is synchronized to the container movement, so that for each container one and only one spout is in a dispensing position, and it dispenses while rotating in the same direction that the can is moving, so that the dispensing spout actually follows the can along while moving in a discharge arc, rather than remaining stationary while the can moves beneath it and relative to it. The sloping walls considerably reduce the splatter problem because the liquid first strikes these walls at its discharge outlet pressure and then drops into the can, instead of being forced directly into the can as a sudden charge under high pressure. At the same time, a relatively large outlet opening can be used to give rapid filling, and the use of the discharge arc makes it possible to move the cans much faster than was formerly possible.

Other objects and advantages of the invention will appear from the following description of some preferred embodiments thereof.

In the drawings:

FIG. 1 is a view in elevation and partly in section of a dispensing device incorporating the principles of the present invention. Some portions are shown diagrammatically, and a non-dispensing position of the flexible hose is shown in broken lines, its dispensing position being shown in solid lines.

FIG. 2 is a fragmentary view in section taken along the line 2—2 in FIG. 1.

FIG. 3 is a view in side elevation taken along the line 3—3 in FIG. 1.

FIG. 4 is a fragmentary view in elevation and in section taken along the line 4—4 in FIG. 1.

FIG. 5 is a view in perspective of the collection tank.

FIG. 6 is a fragmentary view in side elevation and section, showing the relation between the collection tank and the dispensing wheel.

FIG. 7 is a top plan view of the portions shown in FIG. 6.

FIG. 8 is a view generally similar to FIG. 1 with some additional portions shown in section of a modified form of device also embodying the principles of the invention.

One current liquid dispensing system, which is illustrated in rudimentary fashion in FIGS. 1–7, has a supply 11 of liquid 12 at constant pressure, which it feeds through a constant flow valve 13 into a tube 14. The tube 14 has a discharge outlet 15 from which the liquid 12 issues at a constant pressure and constant flow. Heretofore, the liquid to be discharged has been fed through a solenoid, often a rotary type solenoid, in which the valve was moved from a "fill" position to a "return" position, intermittently filling the cans and returning liquid 12 by a tube 16 to a reservoir 17, whence it could be recirculated to the supply 11 by a pump 18 and conduit 19. However, such valves issued the liquid 12 into the cans at high pressure and splashed out; also, being stationary, the valve had difficulty filling the can before the can moved past it.

In the present invention, a dispensing wheel 20 is mounted for support on a rotating hub 21, which is itself mounted upon a stationary shaft 22. The wheel 20 is located at a dispensing location 23 above a can conveyor 24. There is a means for synchronizing the wheel 20 with the movement of containers along the conveyor 24; for example, a star wheel 25 may be located at one side of the conveyor 24, with a series of pockets 26 so that each can 27 goes into one pocket 26 and rotates a shaft 28. The shaft 28 extends upwardly and is properly supported in the usual manner with thrust bearings. A mitered gear 30 at its upper end mates with a mitered gear 31 around the shaft 22, and the gear 31 rotates the hub 21; therefore the containers 27 act through the star wheel 25 to turn the dispensing wheel 20 at the same angular speed that the star wheel 25 is being turned.

The dispensing wheel 20 preferably has the same number of funnel-like pouring spouts 33 as the star wheel 25 has pockets 26, so that for each pocket 26 there is one pouring spout 33, moving at the same speed as the pocket. Moreover, the spouts 33 are so aligned that the bottom of the wheel 20 is moving in the same direction as the cans 27 and preferably at about the same speed, as will be the case in normal size operations.

The dispensing wheel 20 may be made from stainless steel or aluminum, and each pouring spout 33 may comprise a set of sloping converging walls 34 leading to a large outlet opening 35. There may be four walls 34, for example, or the spout may be conical, if that is desired. The dispensing wheel 20 for the particular type of installation shown in FIGS. 1–7 preferably has one closed wall 36 and a side opening 37 through its other side wall 38 to provide an entryway for a flexible supply hose 40 which is affixed to the end of the feed tube 14 and which provides the outlet 15 in this invention.

The return conduit 16 leads from a sump opening 41 in a collecting pan 42, which is located on the open side of the wheel 20. The flexible supply hose 40 is moved back and forth during operation so that during the filling interval it is inside the wheel 20 and at other times is outside the wheel 20 and over the pan 42. The pan 42 has a side wall 43 which extends up from beneath and beyond a flange 44 that is affixed to the wall 38 to provide an overlap between the dispensing wheel 20 and the pan 42, so that no liquid drops in between them. Furthermore, the pan 42 has an additional drip collecting extension 45 on the side at which the wheel 20 is moving upwardly, to collect drops from the spouts 33 which cannot fall into the proper can 27 and which therefore tend to drop on the conveyor 24. This extension 45 is connected to the pan 42 by an opening 46 so that drippings from the spouts 33 flow into the pan 42 and thence into the return conduit 16 leading to the liquid reservoir 17, whence it may be used again if that is desired.

Movement of the supply hose 40 may be accomplished by the use of a rotary solenoid 47, as shown in the drawings. A shaft 48 extends outwardly, and a bracket 50 secured to the solenoid 47 is clamped to the feed tube 14 so that only the flexible terminal portion 40 can move during the operation. Connected to the shaft 48 is a pin 52 which extends downwardly and is provided with a clevis 53. A pivot pin 54 bridges the clevis 53 and to it is pivoted a connecting rod 55. The outer end of the connecting rod 55 is secured to a clamp 56 around the supply hose 40. When the solenoid 47 is in its energized position, the supply hose 40 is pushed into the dispensing wheel 20, and when the solenoid 47 is no longer energized, the supply hose 40 is pulled out of the wheel 20 and over the pan 42.

Actuation of the solenoid 47 may also be synchronized by the star wheel 25, by providing on the upper surface of the star wheel 25 one actuating device 57 for each pocket 26. The device 57 may be like a typical cam follower, though not used actually to follow a cam. The devices 57 actuate the arm 58 of a microswitch 60 which is located adjacent the conveyor 24. The actuating device 57 engaging the switch arm 58 at any moment need not be the one which is closest to the pocket 26 for the container 27 to be filled, since the entire star wheel 25 is synchronized with itself; any device 57 may be used so long as the proper accommodation and location of the microswitch 60 (or other control device) is made to assure proper synchronization.

The microswitch 60 is connected to the solenoid 50 through a timer circuit 61, which determines the length of time the solenoid 47 remains on. In other words, the microswitch 60 actuates the solenoid 47 and causes it to be energized, but the length of time for which the solenoid 47 remains energized is determined by the timer 61. Timers are well known in the art and are able to give very accurate dispensing times of very small fractions of a second. With constant flow rate at constant pressure, it is apparent that the time of energization will determine the amount of liquid dispensed. Some of the flow is divided during its crossing the wall 38 into and out from the dispensing wheel 20, but all this can be compensated for by initial adjustments of the machine for each particular type of cycle.

The solenoid 47, gears 30 and 31, dispensing wheel 20, and other elements may be supported through a base plate 62 and an adjustable frame 63, including support rods 64, bars 65, and a journal bushing 66. The solenoid 47 is secured to a bracket 67 of the frame 63.

In operation of the device of FIGS. 1–7, the liquid 12 is supplied at constant pressure and constant flow to the supply hose 14. As the cans 27 move along the conveyor 24, they engage the star wheel 25 and turn it. This causes the dispensing wheel 20 to turn at the same angular rate as the star wheel 25 and preferably at approximately the same peripheral rate, and it also actuates the solenoid 47 at the proper time to cause the solenoid 47 to be energized and thereby project into the dispensing wheel 20 the supply hose 40 for a predetermined interval of time, and the timer 61 de-energizes the solenoid to pull the hose 40 out from the wheel 20 and over the pan 42. During the time that it is in the wheel 20, the hose 40 discharges liquid against the sloping walls 34 of the spout 33, and the spout 33 follows the can 27 over a discharge arc, moving with the can 27 so that the liquid 12 is discharged as near to the center of the container 27 as may be feasible during the discharge period. Also, when the liquid strikes the walls 34, its force is reduced and it merely falls through the opening 35 into the can 27. Its high pressure is thereby expended in striking the sloping walls 34 rather than in striking the bottom of the can 27 and splashing out of the can. When the hose 40 is withdrawn from the dispensing wheel 20, the liquid 12 is returned to the liquid reservoir 17, as is such liquid as drips off the last portion of the dispensing spout 33 after it has dispensed its charge into the can and falls on the pan extension 45.

The dispensing wheel 20 is not limited in application to use with a constant-pressure constant-flow type of apparatus. It may also be used with other dispensing apparatus, as shown in FIG. 8. Here the same wheel 20 is used with a pneumatically operated dispensing cylinder 70 with a ram 71 which measures a charge in a chamber 72 and has a piston 73 that dispenses the charge via a flow control valve 74 and a conduit 75 through an outlet 76. The outlet 76 may pass through a side wall 77 of the dispensing wheel 20, which may be open as before or may have a rotary fluid seal 78 closing the wall 77, so that there is no splatter at all out of the wheel 20 into the area outside the wheel. If desired, a pan like the pan 42 may be used to collect at least the drip portion from the final upward movement of the discharge spout 33. Here again, during operation everything is synchronized, with the timing operation being substantially identical except that it operates a pneumatic circuit instead of a solenoid and operates through a cylinder instead of moving a spout back and forth. The same synchronization is readily achieved and the same result of having the funnel-like spout 33 follow the can 27 and enable high-speed dispensing without splashing the liquid out of the can and without substantial spilling of the liquid is again achieved.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A liquid-dispensing device for guiding a premeasured charge of liquid in each of a series of rapidly moving containers, while minimizing splatter, drip, and spillage losses, said device being useful in a dispensing system having liquid supply means, premeasuring means for measuring successive charges of said liquid, and a liquid outlet for said charges above a container conveyor, said device comprising:

support means adjacent said conveyor, a hollow dispensing wheel rotatably mounted on said support means above said conveyor, where said containers pass one at a time, said wheel comprising a circumferential series of successive funnel-like peripheral pouring spouts always open at both ends, the successive spouts joining each other at sharp radially inner edges, said liquid outlet being inside said wheel, synchronizing means for sending each premeasured charge of said liquid into one and only one said spout, and means contacted and driven by the advancing containers for rotating said wheel in synchronism with the container moving beneath it, with one spout moving through a dispensing arc for each said container to fill that one container with its said charge while moving in the same direction as said container.

2. The device of claim 1 wherein said synchronizing means and said means for rotating said hollow wheel in synchronism with the container moving beneath it comprises a star wheel, means operatively connecting said star wheel to said premeasuring means, and means operatively connecting said star wheel to said hollow wheel for rotation together, whereby said containers drive said star wheel and said star wheel drives said hollow wheel and actuates said premeasuring means.

3. The device of claim 1 having means for catching drops falling from said spout after a predetermined angular position has been reached.

4. A liquid-dispensing device for placing a measured charge of liquid in each of a series of rapidly moving containers, while minimizing splatter, drip, and spillage losses, said device being useful in a dispensing system having liquid supply means and a container conveyor, said device comprising:

support means adjacent said conveyor, a hollow dispensing wheel rotatably mounted on said support means above said conveyor, where said containers pass one at a time, said wheel comprising a circumferential series of successive funnel-like peripheral pouring spouts always open at both ends and joining one another at sharp edges, means for sending a measured charge of said liquid from said supply means in synchronization with the rotation of said wheel into one said spout for each container, and means contacted and driven by the advancing containers for rotating said wheel in synchronism with the container moving beneath it, with one spout moving through a dispensing arc for each said container to fill that one container with its said charge while moving in the same direction as said container.

5. The device of claim 4 wherein an actuating means is connected to said means for sending a measured charge through a timer means.

6. The device of claim 4 wherein said means for sending a measured charge includes a flexible hose and an actuation means includes means for moving said hose into and out from said wheel.

7. The device of claim 4 wherein said means for sending a measured charge includes a pneumatically operated measuring cylinder with an ejecting piston.

8. A liquid-dispensing device for placing a measured charge of liquid in each of a series of rapidly moving containers, while minimizing splatter, drip, and spillage losses, said device being used in a dispensing system having liquid supply means with a liquid discharge outlet, a container conveyor, and star wheel means adjacent to said conveyor driven by the containers moved along said conveyor, said star wheel having a series of pockets, said device comprising:

support means adjacent said conveyor, a hollow dispensing wheel rotatably mounted on said support means above said conveyor so that said containers pass beneath said wheel one at a time, said dispensing wheel comprising a series of successive funnel-like pouring spouts always open at both ends with sloping walls spaced around the periphery and meeting at radially inner sharp edges, one spout for each star-wheel pocket, said wheel providing an entry for said discharge outlet, means driven by said star wheel means for rotating said dispensing wheel in synchronism with the container moving beneath it, with the bottom of the wheel moving in the same direction as said container, so that each spout goes through a dispensing arc while filling one said container with one said measured charge, and discharge means actuated by said star wheel means for sending a measured charge from said discharge outlet into said dispensing wheel for each container, said liquid striking said sloping walls and flowing into said container over said dispensing arc.

9. The device of claim 8 wherein said discharge means includes a flexible hose supplied at a constant rate with liquid from said supply means and means for moving said hose inside said dispensing wheel for sending its said charge thereinto and for moving said hose out from said container at other times.

10. The device of claim 8 wherein said discharge means includes liquid measuring means and intermittent means for ejecting a measured charge from said measuring means through said outlet.

11. A liquid-dispensing device for placing a measured charge of liquid in each of a series of rapidly moving containers, while minimizing splatter, drip, and spillage losses, said device being used in a dispensing system having liquid supply means with a liquid discharge outlet, a container conveyor, and star wheel means adjacent said conveyor and driven by the containers moved along said conveyor, said star wheel having a series of pockets, said device comprising:

support means adjacent said conveyor, a hollow dispensing wheel rotatably mounted on said support means above said conveyor so that said containers pass beneath said wheel one at a time, said dispensing wheel comprising a series of successive funnel-like pouring spouts always open at both ends and with sloping walls spaced around the periphery and meeting at radially inner sharp edges, one spout for each star-wheel pocket, said wheel providing an entry for said discharge outlet, means driven by said star wheel means for rotating said dispensing wheel in synchronism with the container moving beneath it, with the bottom of the wheel moving in the same direction as said container, so that each spout goes through a dispensing arc while filling one said container with one said measured charge, discharge means actuated by said star wheel means for sending liquid from said discharge outlet into said dispensing wheel for each container, said liquid striking said sloping walls and flowing into said container over said dispensing arc, and timer means for stopping the discharge of liquid into said wheel after a predetermined interval of dispensing time.

12. A liquid-dispensing device for placing a measured charge of liquid in each of a series of rapidly moving containers, while minimizing splatter, drip, and spillage losses, and used in a system comprising means for feeding said liquid at constant pressure and at a constant rate, a controlling solenoid, a container conveyor, actuating means synchronized with said movement of successive containers for actuating said solenoid, and timing means for maintaining the solenoid in an energized position for a predetermined time interval after actuation, said device comprising:

support means adjacent said conveyor, a hollow dispensing wheel rotatably mounted on said support means above said conveyor where said containers pass one at a time, said wheel comprising a series of successive funnel-like peripheral pouring spouts with sloping walls and an outlet opening, and having a side entry opening, means for rotating said wheel in synchronism with the movement of successive containers moving beneath it and with the bottom of the wheel moving in the same direction as said containers, a liquid-return collection means mounted on said support means adjacent said wheel, a reservoir for returned liquid connected to said collection means, a flexible outlet hose on the outlet end of said means for feeding normally overlying said collection means, and means operated by said solenoid for moving said outlet hose into said dispensing wheel through said side entry opening so as to dispense liquid into one said pouring spout during said predetermined time interval and then retracting it from said dispensing wheel to a position over said collection means, said liquid dispensed into said spout striking said sloping walls and dropping out said outlet opening as said spout moves along a discharge arc while filling the container moving along beneath it.

13. The device of claim 12 wherein said collection means has an extension extending in front of said wheel to catch liquid falling from each said spout after it has passed a predetermined angular position.

14. The device of claim 12 wherein said means for rotating said wheel includes a star wheel adjacent said conveyor and driven by the containers moved along said conveyor, said star wheel having a series of pockets, one pocket for each pouring spout of said dispensing wheel, said star wheel being driven by said containers as they are moved by said conveyor, and means driven by said star wheel for rotating said dispensing wheel in synchronism with the containers moving said star wheel.

15. The device of claim 14 wherein said actuating means for said solenoid is driven by said star wheel and synchronized by it.

16. A liquid-dispensing device for placing a measured charge of liquid in each of a series of rapidly moving containers, while minimizing splatter, drip, and spillage losses, and used in a system comprising a measuring and dispensing cylinder-and-piston means having an outlet opening, a container conveyor, and actuating means synchronized with container movement along said conveyor for actuating said cylinder and piston means, said device comprising:

support means adjacent said container conveyor, a hollow dispensing wheel rotatably mounted on said support means above said conveyor where said containers pass one a time, said wheel comprising a series of successive funnel-like peripheral pouring spouts always open at both ends and each with sloping walls leading to an outlet opening from sharp-edged intersections with each other, and drive means for rotating said wheel in synchronism with the container moving beneath it, so that the bottom of said wheel moves in the same direction as said conveyor, with one said spout moving in synchronism with said cylinder and piston means, for emptying said charge from said cylinder and piston means into a said spout and from there into a said container while said container is moving and said spout is moving along a discharge arc.

17. The device of claim 16 wherein said drive means includes a star wheel adjacent said conveyor and driven by the containers moved along said conveyor, said star wheel having a series of pockets, one for each spout, and means driven by said star wheel for rotating said dispensing wheel in synchronism with the containers moving said star wheel.

18. The device of claim 17 wherein said cylinder and piston means is also actuated by said star wheel means for sending a measured charge into said dispensing wheel for each container at a time determined by the position of the containers driving said star wheel.

References Cited

UNITED STATES PATENTS

| | | | |
|---|---|---|---|
| 2,554,939 | 5/1951 | Chapman | 141—162 X |
| 952,331 | 3/1910 | Hoyt | 141—134 X |
| 1,833,028 | 11/1931 | Lindley | 141—162 |
| 2,588,483 | 3/1952 | Chapman | 141—134 X |
| 2,710,127 | 6/1955 | Fechheimer | 141—86 X |
| 3,065,775 | 11/1962 | Keves | 141—131 |
| 3,145,803 | 8/1964 | Cobert | 222—318 X |

LAVERNE D. GEIGER, *Primary Examiner.*

E. J. EARLS, *Assistant Examiner.*